Dec. 9, 1958  C. G. MARTIN  2,863,288
AIR PRESSURE CONTROL MEANS FOR AIR TURBINE DRIVE SYSTEMS
Filed Nov. 19, 1954
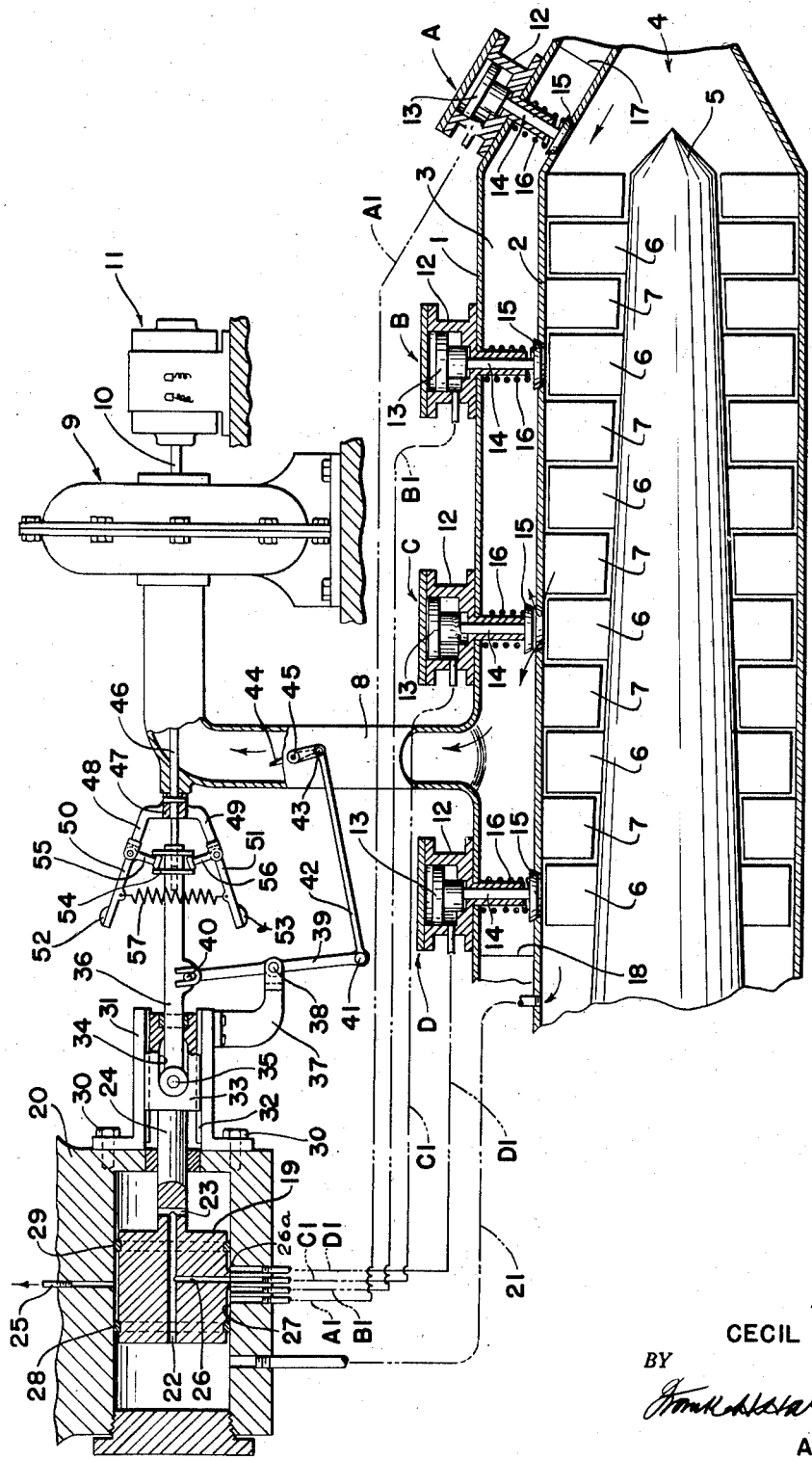
INVENTOR.
CECIL G. MARTIN
BY
ATTORNEY

# United States Patent Office 2,863,288
Patented Dec. 9, 1958

2,863,288

AIR PRESSURE CONTROL MEANS FOR AIR TURBINE DRIVE SYSTEMS

Cecil G. Martin, Cleveland, Ohio, assignor to Jack & Heintz, Inc., Cleveland, Ohio, a corporation of Delaware Application November 19, 1954, Serial No. 470,051

4 Claims. (Cl. 60—62)

This invention relates to improvements in automatic control means for controlling the supply of air pressure available from the compressor of a jet engine for driving an air turbine as the source of driving energy for various types of machines.

The conventional practice is to effect such a control solely by means of a throttling butterfly valve arranged in the conduit between the compressor and the air turbine. This results in an inefficient waste of compressed air needed by the jet engine for its efficient operation.

One of the primary objects of my invention is to provide such a control that will virtually eliminate throttling and its attending disadvantages.

More specifically, my object is to provide a construction including a series of longitudinally spaced valves, by means of which air in any desired degree of compression may be drawn off from the compressor through the conduit to the compressor in response to the requirements of the air turbine, the valve actuation being under the control of the air turbine governor, for obtaining constant air pressure supply, or pressure differential, or pressure ratio, or for obtaining constant speed in order to properly drive its machine.

With the foregoing and other objects in mind, the invention resides in the combination of parts and in the details of construction hereinafter set forth in the following specification and appended claims, certain embodiments thereof being illustrated in the accompanying drawing which is a diagrammatical illustration of one form of my invention, showing a fragmentary longitudinal section of a jet engine, an outer casing and conduit to an air turbine for driving an electrical machine, and a series of longitudinal spaced valves for controlling the tap off of air from the compressor to the center casing and the conduit leading to the air turbine.

Referring more particularly to the drawing, casing 1 is an outer housing arranged about the compressor casing 2, leaving a space 3 therebetween for air travel. The air inlet is shown at 4 for air to travel in the direction of the arrows around the diffuser 5 to rotating blades 6 alternately arranged between stationary blades 7. Communicating with air passage 3 is a conduit 8 for delivering pressure air to an air turbine 9 for driving the shaft 10 of an electric machine 11.

In the illustration I have shown four valve assemblies, generally indicated at A, B, C and D, and of identical construction, for opening and closing communication from the compressor casing 2 to air passage 3 in casing 1. Each of these valves may include a cylinder 12, a piston 13, slidable in the cylinder and having a valve stem 14 and a poppet type valve 15, normally held against its seat by a compression coil spring 16 to close communication between the compressor and air passage 3. Air passage 3 is closed by an end wall 17 near the inlet 4 and forward of valve A and by an end wall 18 to the rear of valve D.

If all four valves 15 of valve assemblies A, B, C and D are closed, no air will be supplied to the air turbine 9 to drive it and consequently the shaft 10 of the electrical machine 11 will not be driven. As stated before, my invention is appropriate for use in a system employing an air turbine having a governor designed for constant speed for governing the required operation of the electrical machine. Thus, if valves B, C and D remain closed and the valve 15 of valve assembly A is opened, air under minimum, or practically no compression, is admitted to passage 3 through conduit 8 to the air turbine 9 for driving the latter, under minimum requirements of the air turbine, while the greater majority of the air flows through the compressor to fulfill the requirements of the jet engine. If a greater pressure supply of compressed air available from the compressor is required by the air turbine, valve assembly A is closed and valve assemblies C and D remain closed and valve assembly B is opened. The result is the tapping off of air under a progressively greater degree of compression, due to its longitudinal spacing along the length of the compressor with respect to valve A. It follows that opening of valve assembly C, as shown in the drawing, while the remainder of the valves are closed, provides for a tapping off of air under progressively greater compression from the compressor. All of this is accomplished with the minimum degree of throttling in the conduit 8 and with the minimum supply of air from the compressor needed by the jet engine.

It is to be understood that any suitable number of valves may be used and appropriately longitudinally spaced along the length of the compressor. My invention also contemplates the use of a suitable single automatic control for all of the valves, the control being responsive to the air turbine governor to selectively open and close the valves to meet the air turbine requirements.

The high pressure air from the discharge side of the compressor flows to both sides of a piston 19 slidably mounted in a cylinder block 20. This is made possible by a line 21 leading to the left side of piston 19 and passages 22 and 23 leading to the right side of piston 19. Passage 22 is in the piston 19 and its slidable piston rod 24 and transverse passage 23 is in the piston rod. The cylinder 20 is provided with a restricted vent 25. Approximately intermediate of its length, the piston is provided with a transverse air passage 26 extending from the central bore 22 to the outside wall of piston 19 through a narrow land 26a which is adapted for axially slidable sealing engagement with the wall of cylinder 20.

Also leading into this annular space 27 are four lines A1, B1, C1 and D1, leading respectively from the valve assembly cylinder housings A, B, C and D, beneath the pistons 13 therein.

Secured by bolts 30 to cylinder block 20 is a barrel 31 which has internal splines 32 to mate with external splines of a slidable cylindrical block 33 having an elongated axial slot 34. The block 33 is carried by rod 24 and the slot 34 is engaged, with axial lost motion, by pin 35 of a slidable, non-rotating, shaft 36. Secured to barrel 31 is a bracket 37, to which is pivotally secured at 38 an arm 39 whose one end is pivotally secured at 40 to shaft 36 and to whose other end is pivotally secured at 41 to an arm 42 that is pivotally secured at 43 to a butterfly valve 44 pivotally mounted at 45 in the conduit 8. Suitably driven by the turbine 9, as is the shaft 10, is a rotary shaft 46 mounted to rotate in the non-rotating shaft 36, as well as in the conduit housing 8. Fixedly mounted on shaft 46 between the end of non-rotating shaft 36 and conduit housing 8 for rotation with shaft 46 is hub 47 of governor support arms 48 and 49. Bell cranks having arms 50 and 55 and arms 51 and 56 are pivotally mounted on the free ends of governor support arms 48 and 49, respectively. Governor weights 52 and 53 are carried by the free ends of bell crank arms 50 and 51, respectively. The free ends of bell crank arms 55 and 56 are engaged by an annularly grooved sleeve 54 which is fixedly mounted on non-rotating shaft 36. The tension spring 57 normally holds the arms 50 and 51 of the centifugal governor toward each other.

As stated before, the high pressure air from the discharge side of the compressor flows to both sides of the piston to balance the same. As long as the turbine operates at a constant speed there is no movement of the piston. A small increase in speed of the shaft throws the weights 52 and 53 outwardly to move sleeve 54 and shaft 36 and links 39 and 42 to rotate the butterfly valve 44 clockwise toward closing position. The purpose of the elongated slot 34 is so as to allow this change in turbine requirement to go unnoticed insofar as valve stage change of valves A, B, C and D as long as they are slight in amount and in point of time. For greater increases in speed, when pin 35 reaches the left end of slot 34, the block 33, and consequently the piston 19, are forced to the left to change the registry of piston passage 26 from valve stage C to valve stage B. It follows that as the shaft decreases unduly in speed, the spring 57 pulls the weights inwardly, causing shafts 36 and 24 and piston 19 to the right to open the butterfly valve 44 and move the piston to the right to shift passage 26 from valve stage C to D.

From the foregoing description of a preferred embodiment of an air pressure control means, it can be seen that the speed of an air turbine drive system associated with an axial-flow air compressor is regulated by the adjustment of two variables. For small deviations of the speed of the air turbine from a predetermined datum speed, regulation is effected by throttling the air supplied from the axial-flow compressor to the air turbine. For greater deviations in the speed of the air turbine from a predetermined datum speed, regulation is effected by supplying air of greater or lesser density from the axial-flow air compressor to the air turbine in combination with the throttling control of that air. Thus, my invention provides a highly efficient means for driving an air turbine at a constant speed with air supplied from an axial-flow air compressor in which wasteful throttling of air is minimized and substantially all of the energy in the compressed air taken from the axial-flow air compressor is utilized.

I claim:

1. In combination with an axial-flow air compressor having a plurality of compression stages and an inlet and an outlet, an outer casing surrounding said compressor between said inlet and said outlet, an air turbine for supplying shaft power to a load, an air conduit extending between said outer casing and said air turbine for delivering air from said outer casing to said air turbine, a plurality of valves arranged in longitudinally spaced relationship along the length of and communicating with said compressor within said outer casing to provide air at a plurality of compression stages from said compressor to said outer casing, and valve control means responsive to the speed of said air turbine operatively connected to said valves on said compressor for selectively opening said valves whereby the selective opening of said valves in response to said air turbine speed supplies air at different stages of compression to said air turbine from said compressor to regulate and control the speed of said air turbine.

2. In combination with an axial-flow air compressor having a plurality of compression stages and an inlet and an outlet, an outer casing surrounding said compressor between said inlet and said outlet, an air turbine for supplying shaft power to a load, an air conduit extending between said outer casing and said air turbine for delivering air from said outer casing to said air turbine, a throttling valve in said conduit, a plurality of valves arranged in longitudinally spaced relationship along the length of and communicating with said compressor within said outer casing to provide air at a plurality of compression stages from said compressor to said outer casing, and valve control means centrifugally responsive to the speed of said air turbine operatively connected to said valves on said compressor and said throttling valve for selectively opening said valves and adjusting said throttling valve whereby the selective opening of said valves in response to said air turbine speed supplies air at different stages of compression to said air turbine from said compressor and the adjustment of said throttling valve in said conduit in response to said air turbine speed throttles the air supplied from said compressor to said air turbine to regulate and control the speed of said air turbine.

3. In combination with an axial-flow air compressor having a plurality of compression stages and an inlet and an outlet, an outer casing surrounding said compressor between said inlet and said outlet, an air turbine for supplying shaft power to a load, an air conduit extending between said outer casing and said air turbine for delivering air from said outer casing to said air turbine, a throttling valve in said conduit, a plurality of pneumatically operated valves arranged in longitudinally spaced relationship along the length of and communicating with said compressor within said outer casing to provide air at a plurality of compression stages from said compressor to said outer casing, a sealed cylinder having a plurality of longitudinally spaced ports in its sidewall, a plurality of air lines sequentially connecting said longitudinally spaced pneumatically operated valves with said cylinder wall ports, a source of compressed air, a piston longitudinally slidable in said cylinder having a side wall port connected to said compressed air source and alignable with said cylinder wall ports, a centrifugal governor responsive to the speed of said air turbine and operatively connected to said piston for longitudinal movement of said piston in said cylinder and selective alignment of said piston port with said cylinder wall ports and operatively connected to said throttle valve for throttling control of said conduit all in accordance with the speed of said air turbine whereby the selective opening of said valves in response to said air turbine speed supplied air at different stages of compression to said air turbine from said compressor and the adjustment of said throttling valve in said conduit in response to said air turbine speed throttles the air supplied from said compressor to said air turbine to regulate and control the speed of said air turbine.

4. The combination according to claim 2 in which said valve control means includes a lost motion connection whereby small changes in the speed of said air turbine operates said throttling valve to regulate the quantity of air supplied to said air turbine and larger changes selectively open said valves to supply said air turbine with air from different compression stages of said compressor.

References Cited in the file of this patent

UNITED STATES PATENTS

| 2,399,046 | Larrecq | Apr. 23, 1946 |
| 2,612,020 | Griffith | Sept. 30, 1952 |

FOREIGN PATENTS

| 586,710 | Great Britain | Mar. 28, 1947 |
| 1,068,638 | France | Feb. 10, 1954 |